(12) United States Patent
Xi

(10) Patent No.: US 9,350,948 B2
(45) Date of Patent: May 24, 2016

(54) METHOD AND SYSTEM FOR PROVIDING VIDEO SERVICE

(71) Applicant: Wistron Corporation, New Taipei (TW)

(72) Inventor: Sha-Sha Xi, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/583,114

(22) Filed: Dec. 25, 2014

(65) Prior Publication Data

US 2015/0296182 A1  Oct. 15, 2015

(30) Foreign Application Priority Data

Apr. 14, 2014  (CN) .......................... 2014 1 0148435

(51) Int. Cl.
*H04N 7/14* (2006.01)
*H04M 3/42* (2006.01)
*H04N 7/15* (2006.01)
*H04M 3/56* (2006.01)

(52) U.S. Cl.
CPC ................. *H04N 7/152* (2013.01); *H04N 7/15* (2013.01); *H04M 3/56* (2013.01); *H04M 3/562* (2013.01)

(58) Field of Classification Search
CPC ..... G01S 5/0072; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270
See application file for complete search history.

(56) References Cited

U.S. PATENT DOCUMENTS 5,473,363 A * 12/1995 Ng ........................ H04M 3/567
348/14.09
8,892,087 B2 * 11/2014 Ackley ................... G08C 17/02
340/3.1

(Continued)

FOREIGN PATENT DOCUMENTS

CN 101267329 9/2008
CN 101316351 12/2008

(Continued)

*Primary Examiner* — Khai N Nguyen
(74) *Attorney, Agent, or Firm* — Jianq Chyun IP Office

(57) ABSTRACT

A method and a system for providing a video service for distributing a plurality of multipoint control units (MCU) in an MCU cluster to forward the video service via a controller are provided. The method includes, through a first MCU among the MCUs, receiving the video service published by the publisher terminal. The method also includes forwarding the video service from the first MCU to at least one second MCU among the MCUs, and establishing at least one nice connection corresponding to the video service in the second MCU. In addition, at least one subscriber terminal receives the video service through the at least one nice connection. Accordingly, the method can provide sufficient resources of the video service to the subscriber terminals by dynamically distributing system resources of a plurality of the MCUs.

18 Claims, 6 Drawing Sheets

(56) References Cited

U.S. PATENT DOCUMENTS

2005/0007446 A1* 1/2005 Schrader ............... H04N 7/152 348/14.09
2007/0239899 A1* 10/2007 Gonen ............... H04L 12/1827 709/249
2010/0149305 A1* 6/2010 Catchpole .......... G06K 9/00288 348/14.08

FOREIGN PATENT DOCUMENTS

| CN | 101938624 | 1/2011 | |
|---|---|---|---|
| WO | 0201833 | 1/2002 | |
| WO | WO 0201833 A1 * | 1/2002 | .............. G06F 9/541 |

* cited by examiner

METHOD AND SYSTEM FOR PROVIDING VIDEO SERVICE

CROSS-REFERENCE TO RELATED APPLICATION

This application claims the priority benefit of China application serial no. 201410148435.0, filed on Apr. 14, 2014. The entirety of the above-mentioned patent application is hereby incorporated by reference herein and made a part of this specification.

BACKGROUND

1. Field of the Invention

The invention relates to a system and a method for providing a video service. More particularly, the invention relates to a method and a system for providing a video service for distributing a plurality of multipoint control units (MCU) in an MCU cluster to forward the video service via a controller.

2. Description of Related Art

Along with advancement of networking communication technologies as well as presence and development of video services, video conference terminals located in different places are connected by video service systems through communication networks. Under the control of multipoint control units (MCUs), geographically separated users can exchange information mutually by means, such as graphics, voices and so on, through a video conference service and can use application systems that support the users for real-time message exchanging and sharing or starting collaborative work in distance. The video services can not only enhance fidelity, effectiveness and convenience of communication among the users in different places, but also play an important role in distant learning programs and business conferences.

Nevertheless, when large on-line video communication, such as an on-line education system or a simulation of large-site classroom session, is requested, an individual MCU is incapable of providing sufficient video service resources to all subscriber terminals due to limitations in system resources thereof and limited upgrade of hardware capabilities.

FIG. 1 is a schematic diagram of publishing and subscribing a video service through an individual multipoint control unit (MCU).

Referring to FIG. 1, when a publisher terminal 100 publishes a video service through a designated first MCU 310a to provide the video service, other subscriber terminals (e.g., subscriber terminals 102 and 104) can only subscribe the video service through the same first MCU 310a where the publisher terminal 100 is located. Namely, if the number of the subscriber terminals exceeds the maximum limit that one MCU can afford, the MCU cannot provide the subscriber terminals with sufficient service resources. Accordingly, how to facilitate the subscriber terminals 102 and 104 in getting rid of limitations from limited resources of the MCU and increase the number of users participating in the video service an important goal to be achieved by the persons skilled in the field.

SUMMARY

The invention is directed to a method for providing a video service and a system thereof capable of effectively increasing a serving number of people participating in the video service.

The invention is directed to a method for providing a video service for distributing a plurality of multipoint control units (MCU) in an MCU cluster to forward the video service via a controller. The method includes receiving the video service published by a publisher terminal through a first MCU among the MCUs, forwarding the video service from the first MCU to at least one second MCU among the MCUs and establishing at least one nice connection corresponding to the video service in the at least one second MCU, wherein at least one subscriber terminal receives the video service through the at least one nice connection.

In an exemplary embodiment of the invention, the step of forwarding the video service from the first MCU to the at least one second MCU among the MCUs and establishing the at least one nice connection corresponding to the video service in the at least one second MCU includes obtaining a plurality of MCUs having free resources from the MCUs, calculating a number of free resources of each of the MCUs which have free resources and descendingly sorting the MCUs according to the number of free resources of each of the MCUs to obtain an available resource list, wherein the obtained MCUs which have free resources are MCUs registered to the controller.

In an exemplary embodiment of the invention, the step of calculating the number of free resources of the MCUs which have free resources and sorting the MCUs in the descending order according to the number of free resources of each of the MCUs to obtain the available resource list includes storing the numbers of free resources of the MCUs which have free resources and the available resource list.

In an exemplary embodiment of the invention, the step of forwarding the video service from the first MCU to the at least one second MCU among the MCUs and establishing the at least one nice connection corresponding to the video service in the at least one second MCU includes: (a) receiving a servicing number of people who receive the video service via the controller; (b) setting a number to be distributed corresponding to the video service according to the servicing number corresponding to the video service via the controller; (c) sequentially assigning one of the MCUs as a target MCU according to the available resource list, determining whether each of the MCUs in the available resource list is sequentially assigned, performing step (d) if there is any unassigned MCU and performing step (j) if each of the MCUs is already assigned; (d) determining whether the number to be distributed is greater than 0, performing step (e) if the number to be distributed is greater than 0 and performing step (j) if the number to be distributed is less than or equal to 0; (e) deducting the number to be distributed from the number of free resources of the target MCU, determining whether a value of the number of free resources deducting the number to be distributed is greater than, equal to or less than 0, performing step (f) if the value is greater than 0, performing step (g) if the value is less than 0 and performing step (h) if the value is equal to 0; (f) storing an index of the target MCU, recording the first parameter as the index of the target MCU and re-performing step (c) to assign a next MCU as the target MCU; (g) determine whether the index of the previous target MCU is recorded in the first parameter, performing step (h) if no and performing step (i) if yes; (h) storing an index of the target MCU, and recording the first parameter as the index of the target MCU; (i) adding the MCU corresponding to the index of the previous target MCU recorded in the first parameter into an distribution result list, clearing values recorded in the first parameter, updating the number to be distributed as the number to be distributed deducting the number of free resources of the MCU corresponding to the index of the previous target MCU and re-performing step (c) to assign a next MCU as the target MCU; (j) determine whether the index of the previous target MCU is recorded in the first parameter, if yes, adding the MCU corresponding to the index of the MCU recorded in the first parameter into the distribution result list and updating the number to be distributed as the number to be distributed deducting the number of free resources of the MCU corresponding to the index of the MCU recorded in the first parameter and if no, performing step (k); and (k) forwarding the video service to the at least one second MCU among the MCUs according to the distribution result list.

In an exemplary embodiment of the invention, the step of forwarding the video service from the first MCU to the at least one second MCU among the MCUs and establishing the at least one nice connection corresponding to the video service in the at least one second MCU includes: establishing nice connections corresponding to the free resources of the first MCU through the first MCU and through a first nice connection of the first MCU, forwarding the video service to the at least one second MCU according to a transmission protocol, establishing nice connections corresponding to the free resources of the at least one second MCU through the at least one second MCU, and forwarding the video service to the at least one subscriber terminal through the at least one nice connection of the at least one second MCU.

In an exemplary embodiment of the invention, the method further includes forwarding the video service to the at least one subscriber terminal through at least one second nice connection of the first MCU.

In an exemplary embodiment of the invention, the transmission protocol is a user datagram protocol (UDP).

In an exemplary embodiment of the invention, the step of receiving the video service published by the publisher terminal through the first MCU among the MCUs includes decoding the video service, classifying and recording audio and video of the video service, recording and recoding the video service.

In an exemplary embodiment of the invention, the video service published by the publisher terminal is forwarded to the first MCU through a real-time transport protocol (RTP).

In an exemplary embodiment of the invention, the subscriber terminal subscribes the video service by a browser through the RTP.

The invention is directed to a system for providing a video service. The system includes an MCU cluster having a plurality of MCUs and a controller coupled to a database and the MCU cluster. A first MCU among the MCUs receives a video service published by a publisher terminal, and the controller is configured to distribute the MCUs of the MCU cluster. The controller includes an MCU management module, a data access object (DAO) coupled to the database and an authority administration module. The MCU management module is configured to assign the first MCU to forward the video service to at least one second MCU among the MCUs and to establish at least one nice connection corresponding to the video service in the at least one second MCU. The DAO is configured to access the database. The authority administration module is configured to permit the MCUs to access the database through the DAO. At least one subscriber terminal receives the video service through the at least one nice connection.

In an exemplary embodiment of the invention, the MCU management module is further configured to obtain a plurality of MCUs which have free resources from the MCUs. Additionally, the MCU management module is further configured to calculate a number of free resources of each of the MCUs which have free resources and descendingly sort the MCUs according to the number of free resources of each of the MCUs to obtain an available resource list. The obtained MCUs which have free resources are MCUs registered to the authority administration module of the controller.

In an exemplary embodiment of the invention, the MCU management module is further configured to store the number of the free resources of the MCUs which have free resources and the available resource list in the database.

In an exemplary embodiment of the invention, the MCU management module is further configured to execute the following processes to generate a distribution result list of a distribution order of the MCUs: (a) receiving a servicing number of people who receive the video service; (b) setting a number to be distributed corresponding to the video service according to the servicing number corresponding to the video service; (c) sequentially assigning one of the MCUs as a target MCU according to the available resource list, determining whether each of the MCUs in the available resource list is sequentially assigned, performing step (d) if there is any unassigned MCU and performing step (j) if each of the MCUs is already assigned; (d) determining whether the number to be distributed is greater than 0, performing step (e) if the number to be distributed is greater than 0 and performing step (j) if the number to be distributed is less than or equal to 0; (e) deducting the number to be distributed from the number of free resources of the target MCU, determining whether a value of the number of free resources deducting the number to be distributed is greater than, equal to or less than 0, performing step (f) if the value is greater than 0, performing step (g) if the value is less than 0 and performing step (h) if the value is equal to 0; (f) storing an index of the target MCU, recording a first parameter as the index of the target MCU and re-performing step (c) to assign a next MCU as the target MCU; (g) determining whether the index of the previous target MCU is recorded in the first parameter, performing step (h) if no and performing step (i) if yes; (h) storing an index of the target MCU and recording the first parameter as the index of the target MCU; (i) adding the MCU corresponding to the index of the previous target MCU recorded in the first parameter into an distribution result list, clearing values recorded in the first parameter, updating the number to be distributed as the number to be distributed deducting the number of free resources of the MCU corresponding to the index of the previous target MCU and re-performing step (c) to assign a next MCU as the target MCU; (j) determining whether the index of the previous target MCU is recorded in the first parameter, if yes, adding the MCU corresponding to the index of the MCU recorded in the first parameter into the distribution result list and updating the number to be distributed as the number to be distributed deducting the number of free resources of the MCU corresponding to the index of the MCU recorded in the first parameter and if no, performing step (k); and (k) forwarding the video service to the at least one second MCU among the MCUs according to the distribution result list.

In an exemplary embodiment of the invention, the first MCU establishes nice connections corresponding to the free resources of the first MCU, and the MCU management module is further configured to assign the first MCU to forward the video service to the at least one second MCU according to a transmission protocol through the first nice connection of the first MCU. Additionally, the at least one second MCU establishes nice connections corresponding to the free resources of the at least one second MCU. The MCU management module is further configured to assign the at least one nice connection corresponding to the at least one second MCU to forward the video service to the at least one subscriber terminal.

In an exemplary embodiment of the invention, the MCU management module is further configured to assign at least one second nice connection of the first MCU to forward the video service to the at least one subscriber terminal.

In an exemplary embodiment of the invention, the transmission protocol is a user datagram protocol (UDP).

In an exemplary embodiment of the invention, each of the MCUs includes a coding/decoding module and a recording module. The coding/decoding module is configured to decode and recode the video service, and the recording module is configured to classify and record audio and video of the video service.

In an exemplary embodiment of the invention, the video service published by the publisher terminal is forwarded to the first MCU by a master server through a real-time transport protocol (RTP).

In an exemplary embodiment of the invention, the subscriber terminal subscribes the video service by a browser through the RTP.

To sum up, in the method and the system for providing the video service, the video service is forwarded among the MCUs. Thereby, a subscriber is no longer limited by the resources of one single MCU and the servicing number of people participating in the video service can be effective increased. On the other hand, with the dynamically configuration of the resources of the MCUs in the MCU cluster, the resources can be effectively utilizes, and service performance can be enhanced.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to increase a servicing number of people who participate in a video service, a plurality of multipoint control units (MCUs) is expanded to form an MCU cluster, such that the video service is forwarded among the MCUs. Accordingly, subscribers in a large amount are not limited by limited resources of the MCUs, and the servicing number of people participating in the video service can be effective increased.

Figure 2:
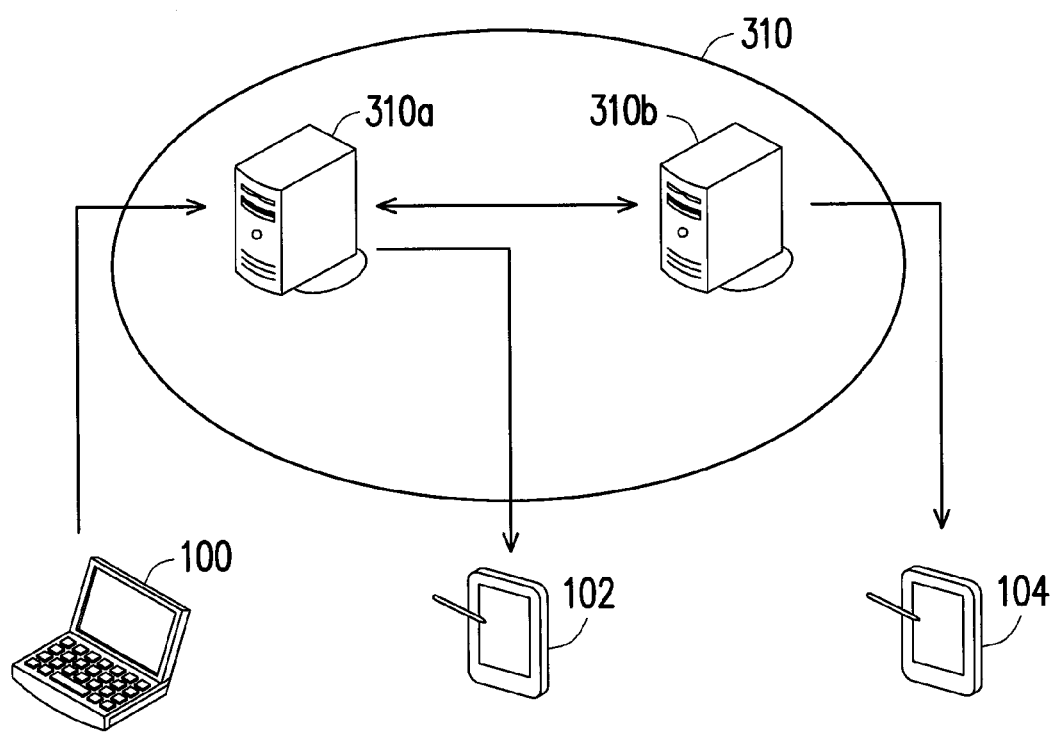
FIG. 2 is a schematic diagram of publishing and subscribing a video service through MCUs in an MCU cluster according to an exemplary embodiment.

FIG. 2 is a schematic diagram of publishing and subscribing a video service through MCUs in an MCU cluster according to an exemplary embodiment.

Figure 1:
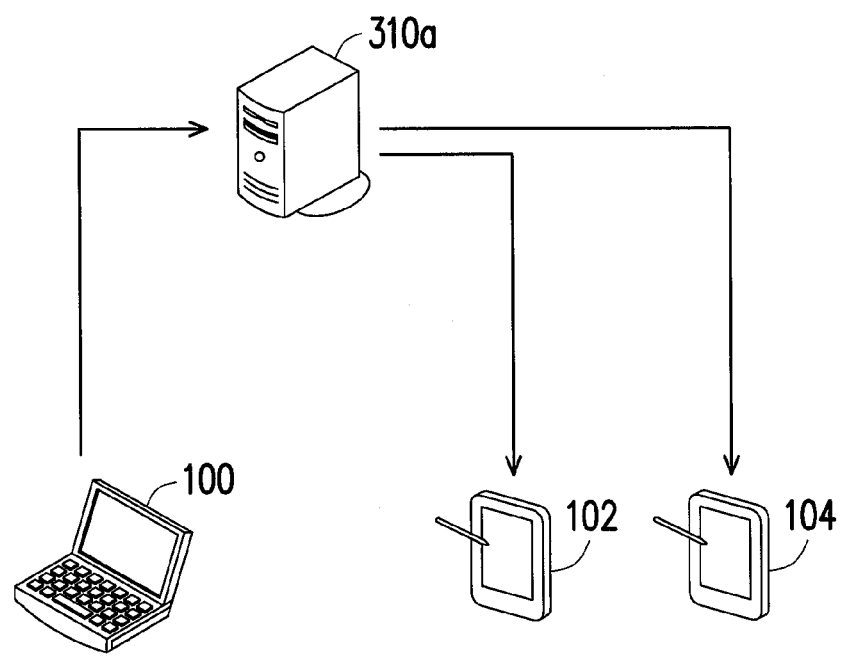
FIG. 1 is a schematic diagram of publishing and subscribing a video service through an individual multipoint control unit (MCU).

Referring to FIG. 2, a first MCU 310a in an MCU cluster 310 forwards a video service published by a publisher terminal 100 to a second MCU 310b. Thus, in comparison with FIG. 1, subscriber terminals 102 and 104 are not limited to subscribing the video service only through the first MCU 310a, and resources of the video service can be increased by means of forwarding the video service among the MCUs, to avoid the limitation by the limited resources of one single MCU.

Figure 3:
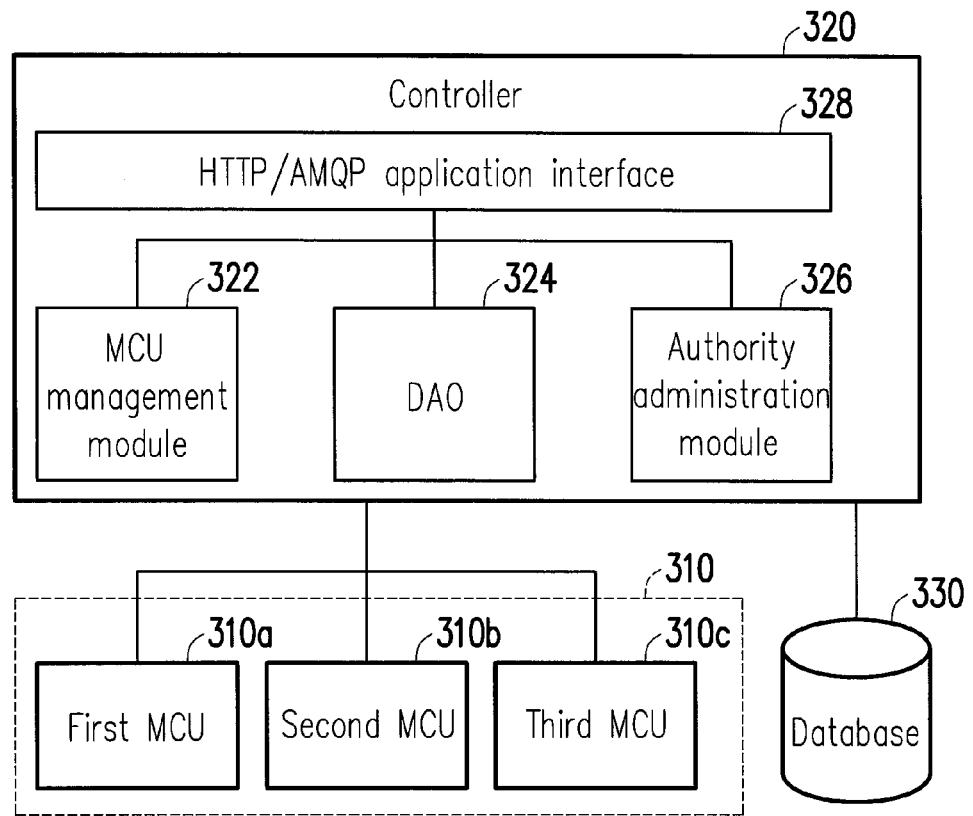
FIG. 3 is a schematic block diagram illustrating a system for providing a video service according to an exemplary embodiment.

FIG. 3 is a schematic block diagram illustrating a system for providing a video service according to an exemplary embodiment.

Referring to FIG. 3, a video service providing system 300 includes an MCU cluster 310, a controller 320 and a database 330. The MCU cluster 310 includes a first MCU 310a, a second MCU 310b and a third MCU 310c. It should be understood that the MCUs are illustrated as three for example in the present exemplary embodiment, but the invention is not limited thereto. For instance, the video service providing system 300 may further include a plurality of MCU clusters, and each MCU cluster may have more MCUs.

The controller 320 is coupled to the database 330 and the MCU cluster 310 and configured to distribute the MCUs (310a through 310c) of the MCU cluster 310. The controller 320 may be any type of control circuit, such as a system-on-chip (SOC), and application processor, a media processor, a microprocessor, a central processing unit (CPU), a digital signal processor or the like.

The controller 320 includes an MCU management module 322, a data access object (DAO) 324, an authority administration module 326 and an HTTP/AMQP application interface 328.

In the present exemplary embodiment, the first MCU 310a is configured to receive a video service published by a publisher terminal.

When the video service is received by the first MCU 310a, the MCU management module 322 is configured to assign the first MCU 310a to forward the video service to the second MCU 310b in the MCU cluster 310, and after receiving the video service, the second MCU 310b establishes at least one nice connection corresponding to the video service. Thus, when subscribing the video service from the MCU cluster 310, at least one subscriber terminal may receive the video service through the at least one nice connection established by the second MCU 310b.

The DAO 324 is coupled to the database 330 and configured to access the database 330.

The authority administration module 326 is configured to permit the MCUs (310a through 310c) to access the database 330 through the DAO 324.

The HTTP/AMQP application interface 328 is configured to provide an application program interface (API) for information transmission with an administrator of a client.

Figure 4:
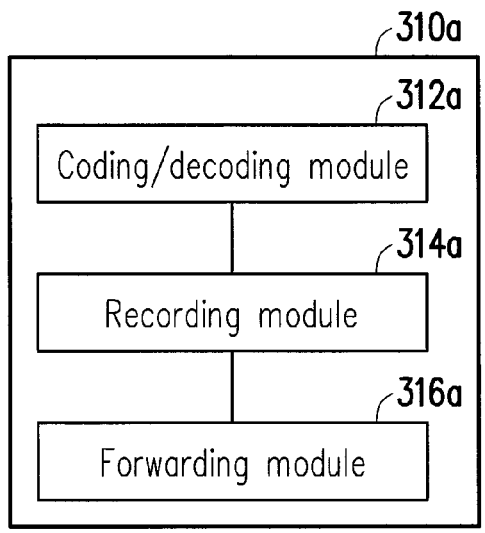
FIG. 4 is a schematic block diagram illustrating an MCU according to an exemplary embodiment.

FIG. 4 is a schematic block diagram illustrating an MCU according to an exemplary embodiment.

Referring to FIG. 4, the structure of the first MCU 310a shown in FIG. 3 is illustrated. The first MCU 310a includes a coding/decoding module 312a, a recording module 314a and a forwarding module 316a. It is to be mentioned that each MCU in the MCU cluster 310 has the aforementioned elements. For instance, the second MCU 310b includes a coding/decoding module 312b, a recording module 314b and a forwarding module 316b. After receiving the video service is received by the first MCU 310a, the coding/decoding module 312a is configured to decode the video service, and the recording module 314a is configured to classify and record audio and video of the video service. Thereafter, the coding/decoding module 312a recodes and encrypts the video service, and the forwarding module 316a forwards the video service to the second MCU 310b in the MCU cluster 310.

Figure 5:
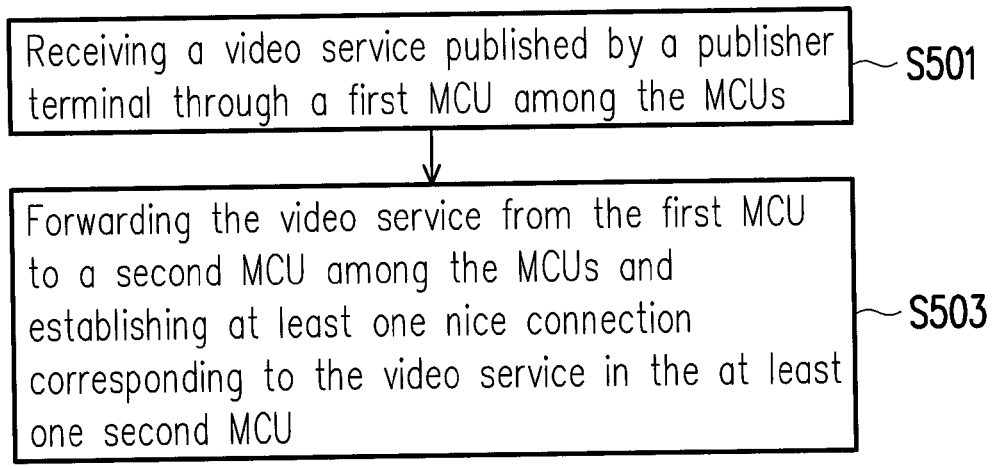
FIG. 5 is a flowchart illustrating a method for forwarding the video service through the MCUs according to an exemplary embodiment.

FIG. 5 is a flowchart illustrating a method for forwarding the video service through the MCUs according to an exemplary embodiment of the present invention.

Referring to FIG. 5, in step S501, the first MCU 310a among the MCUs receives the video service published by the publisher terminal.

Then, in step S503, the first MCU 310a forwards the video service to the second MCU 310b among the MCUs, and at least one nice connection corresponding to the video service is established in the second MCU 310b. Specially, at least one subscriber terminal may receive the video service through the at least one nice connection.

In the present exemplary embodiment, each of the MCUs (310a through 310c) in the MCU cluster 310 has the capability of forwarding the video service. In particular, each of the MCUs (310a through 310c) has different free resources, and a servicing number to be served by the video service published by the publisher terminal may not be necessarily satisfied by a number of free resources of a certain MCU among the MCUs (310a through 310c). Therefore, in an exemplary embodiment of the invention, the controller 320 dynamically distributes or assigns appropriate MCUs that may satisfy the servicing number to be served by the video service published by the publisher terminal depending on the number of free resources currently owned by each of the MCUs (310a through 310c) in the MCU cluster 310.

For instance, the MCU management module 322 of the controller 320 may obtain a plurality of MCUs (310a through 310c) which have free resources from the MCU cluster 310 and calculate numbers of free resources of the MCUs (310a through 310c) which have free resources. The MCU management module 322 of the controller 320 may descendingly sort the MCUs according to the number of free resources of each of the MCUs to obtain an available resource list. Specially, the MCUs (310a through 310c) must be registered to the authority administration module 326 of the controller 320, such that the MCU management module 322 may be allowed to obtain the numbers of free resources of the MCUs (310a through 310c) which have free resources. Furthermore, the MCU management module 322 stores the numbers of the free resources of the MCUs (310a through 310c) which have free resources and the available resource list in the database 330 through the DAO 324.

Figure 6:
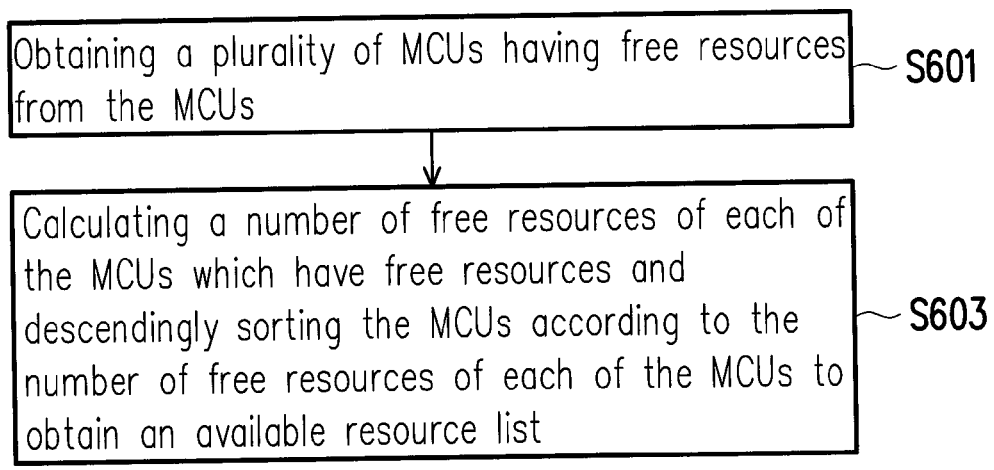
FIG. 6 is a flowchart illustrating a method for obtaining and sorting the MCUs which have free resources via the controller according to an exemplary embodiment.

FIG. 6 is a flowchart illustrating a method for obtaining and sorting the MCUs which have free resources via the controller according to an exemplary embodiment.

Referring to FIG. 6, in step S601, the MCU management module 322 obtains a plurality of MCUs (310a through 310c) which have free resources from the MCUs.

Then, in step S603, the MCU management module 322 calculates a number of free resources of each of the MCUs (310a through 310c) which have free resources and descendingly sorts the MCUs according to the number of free resources of each of the MCUs to obtain an available resource list.

In an exemplary embodiment of the invention, after the MCU management module 322 of the controller 320 obtains the available resource list according to the number of free resources of each MCU in the MCU cluster 310, the MCU management modules executes a series of determination processes according to the servicing number to be served by the video service to generate a distribution result list of a distribution order for assigning each MCU.

Figure 7A:
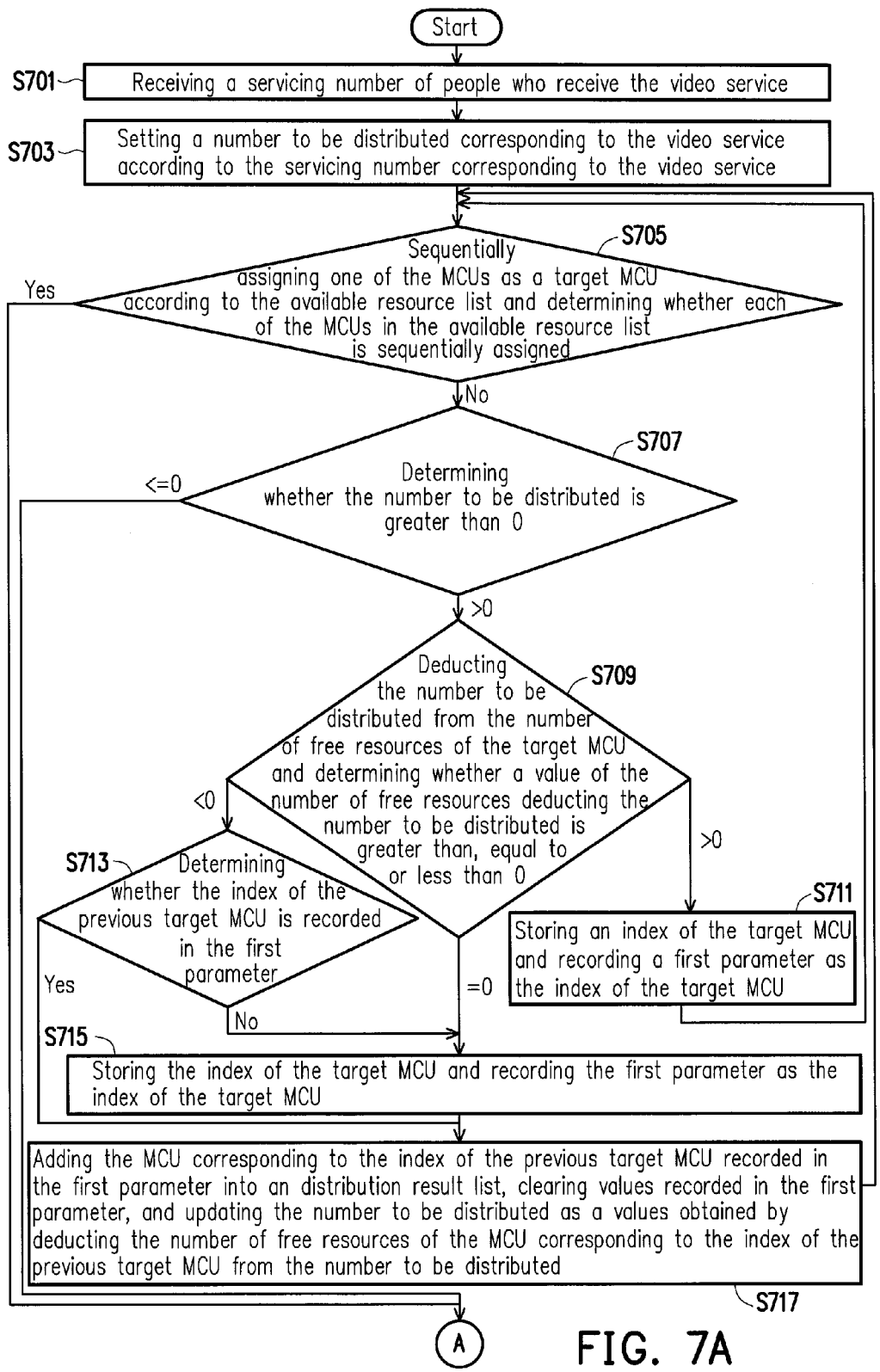
FIGS. 7A and 7B are a flowchart illustrating a method for generating a distribution result list of a distribution order for assigning each MCU based on a serving number to be served by the video service according to an exemplary embodiment.
Figure 7B:
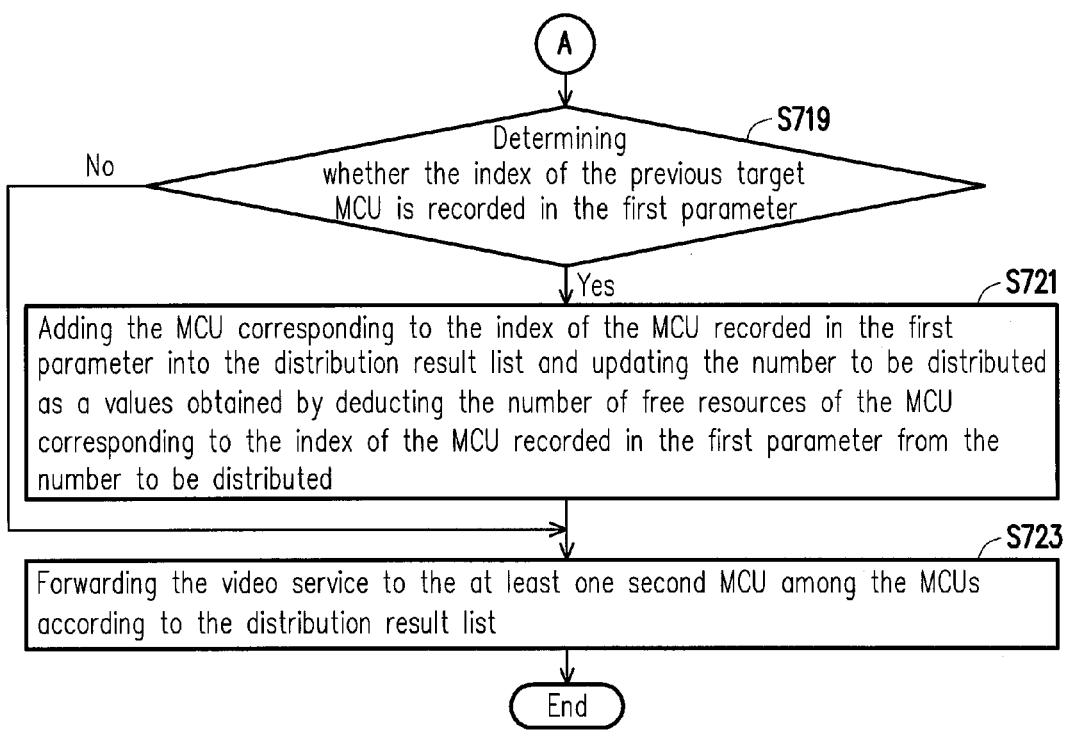

FIGS. 7A and 7B are a flowchart illustrating a method for generating a distribution result list of a distribution order for assigning each MCU based on a serving number to be served by the video service according to an exemplary embodiment of the present invention.

Referring to FIGS. 7A and 7B, first, in step S701, the MCU management module 322 receives a servicing number to be served by the video service published by the publisher terminal. Meanwhile, in step S703, the MCU management module 322 sets a number to be distributed corresponding to the video service according to the servicing number corresponding to the video service.

Then, in step S705, the MCU management module 322 sequentially assigns one of the MCUs which have free resources as a target MCU according to the available resource list and determines whether each of the MCUs in the available resource list is sequentially assigned. If it is determined in step S705 that there is any unassigned MCU, the MCU management module 322 performs step S707. If it is determined in step S705 that there are no unassigned MCUs, the MCU management module 322 performs step S719.

In step S707, the MCU management module 322 determines whether the number to be distributed is greater than 0. If the number to be distributed is greater than 0, the MCU management module 322 performs step S709. Otherwise, if the number to be distributed is less than or equal to 0, the MCU management module 322 performs step S719.

In step S709, the MCU management module 322 deducts the number to be distributed from the number of free resources of the target MCU and determines whether a value of the number of free resources deducting the number to be distributed is greater than, equal to or less than 0. If the value is greater than 0, the MCU management module 322 performs step S711. If the value is less than 0, the MCU management module 322 performs step S713. If the value is equal to 0, the MCU management module 322 performs step S715.

In step S711, the MCU management module 322 stores an index of the target MCU and records a first parameter as the index of the target MCU. Thereafter, the MCU management module 322 re-performs step S705 to assign a next MCU from the available resource list as the target MCU.

In step S713, the MCU management module 322 determines whether the index of the previous target MCU is recorded in the first parameter. If the index of the previous target MCU is not recorded in the first parameter, the MCU management module 322 performs step S715. If the index of the previous target MCU is recorded in the first parameter, the MCU management module 322 performs step S717.

In step S715, the MCU management module 322 stores the index of the target MCU and records the first parameter as the index of the target MCU.

In step S717, the MCU management module 322 adds the MCU corresponding to the index of the previous target MCU recorded in the first parameter into the distribution result list, clears values recorded in the first parameter, and updates the number to be distributed as a value obtained by deducting the number of free resources of the MCU corresponding to the index of the previous target MCU from the number to be distributed. Thereafter, the MCU management module 322 re-performs step S705 to assign a next MCU from the available resource list as the target MCU.

After steps S711 and S717 are ended, step S705 is re-performed to assign a next MCU from the available resource list as the target MCU. Thus, when the MCUs in the available resource list are all assigned, the MCU management module 322 may perform step S719 or alternatively, update the number to be distributed since the number of free resources is continuously deducted from the number to be distributed in step S717. Thus, in step S707, if it is determined that the number to be distributed is 0, the MCU management module 322 may also perform step S719.

In step S719, the MCU management module 322 again determines whether the index of the previous target MCU is recorded in the first parameter. If the index of the previous target MCU is recorded in the first parameter, the MCU management module 322 adds the MCU corresponding to the index of the previous target MCU recorded in the first parameter into the distribution result list and updates the number to be distributed as a value obtained by deducting the number of free resources of the MCU corresponding to the index of the MCU recorded in the first parameter from the number to be distributed (step S721). Meanwhile, if the index of the previous target MCU is not recorded in the first parameter, the MCU management module 322 performs step S723.

In step S723, the MCU management module 322 assigns the first MCU 310a to forward the video service to the second MCU 310b among the MCUs according to the distribution result list.

In the present exemplary embodiment of the invention, resources of the video service can be expanded by means of forwarding the video service among the MCUs in the MCU cluster 310, so as to satisfy a large number of people to be served by the video service. However, in order to mitigate efficiency loss during the operation of forwarding the video service among the MCUs, the MCU management module 322 of the invention would distribute the servicing number corresponding to the same video service to the same MCU as best as possible and uses the MCUs having less free resources in the MCU cluster 310 to satisfy the serving number to be served by the video service published by the publisher terminal to save the MCUs having more free resources for the servicing number with more people demanding for the video service.

Several examples are described below for description. When receiving a video service, the MCU management module 322 determines a distribution result list of MCUs for providing the video service based on the method illustrated in FIG. 7.

First Example

For instance, in the video service providing system 300 of the invention, after a plurality of MCUs (310a through 310c) of the MCU cluster 310 are registered to the authority administration module 326 of the controller 320, the MCU management module 322 obtains a plurality of MCUs (310a through 310c) which have free resources from the MCU cluster 310 and calculates a number of free resources of each of the MCUs (310a through 310c) which have free resources. In this case, it is assumed that the first MCU 310a has 2000 free resources, the second MCU 310b has 1500 free resources and the third MCU 310c has 600 free resources. Thus, the MCU management module 322 descendingly sorts the MCUs according to the number of free resources of each of the MCUs to obtain an available resource list with the first MCU 310a, the second MCU 310b and the third MCU 310c sorted in order.

In the first example, it is assumed that a servicing number to be served by the video service published by the publisher terminal that is received by the MCU management module 322 is 3000 people, and a number to be distributed corresponding to the video service that is set according to the servicing number corresponding to the video service is 3000. In particular, the MCU management module 322 first assigns the first MCU 310a according to the available resource list for determining whether it is a target MCU among the appropriate MCUs. Since the first MCU 310a is the MCU having the greatest number of free resources in the available resource list, the MCU management module 322 distributes the 2000 free resources that can be provided by the first MCU 310a to the number to be distributed of 3000 corresponding to the video service and adds the first MCU 310a in the distribution result list. Furthermore, the MCU management module 322 updates the number to be distributed as 1000 which are not assigned with free resources yet.

Then, the MCU management module 322 assigns the second MCU 310b sorted in the second place according to the available resource list for determining whether it is a target MCU among the appropriate MCUs. Since the number of free resources that can be provided by the second MCU 310b is 2000 and greater than 1000, it will lead to a waste of the free resources if the free resources of the second MCU 310b are distributed to the current number to be distributed. Accordingly, the MCU management module 322 further assigns the third MCU 310c according to the available resource list for determining whether it is a target MCU among the appropriate MCUs. In this case, the MCU management module 322 determines that the number of free resources that can be provided by the third MCU 310c is 600 and is less than the current number to be distributed. It also means that the number of free resources of the third MCU 310c can not satisfy the number to be distributed that is not distributed with free resources yet. Accordingly, the MCU management module 322 selects and adds the more appropriate second MCU 310b into the distribution result list. In this case, the number to be distributed that is to be served by the video service can be fully distributed with the free resources of the MCUs, and in the MCUs recorded in the distribution result list which is obtained by the MCU management module 322, the first MCU 310a and the second MCU 310b are sequentially assigned.

Figure 8:
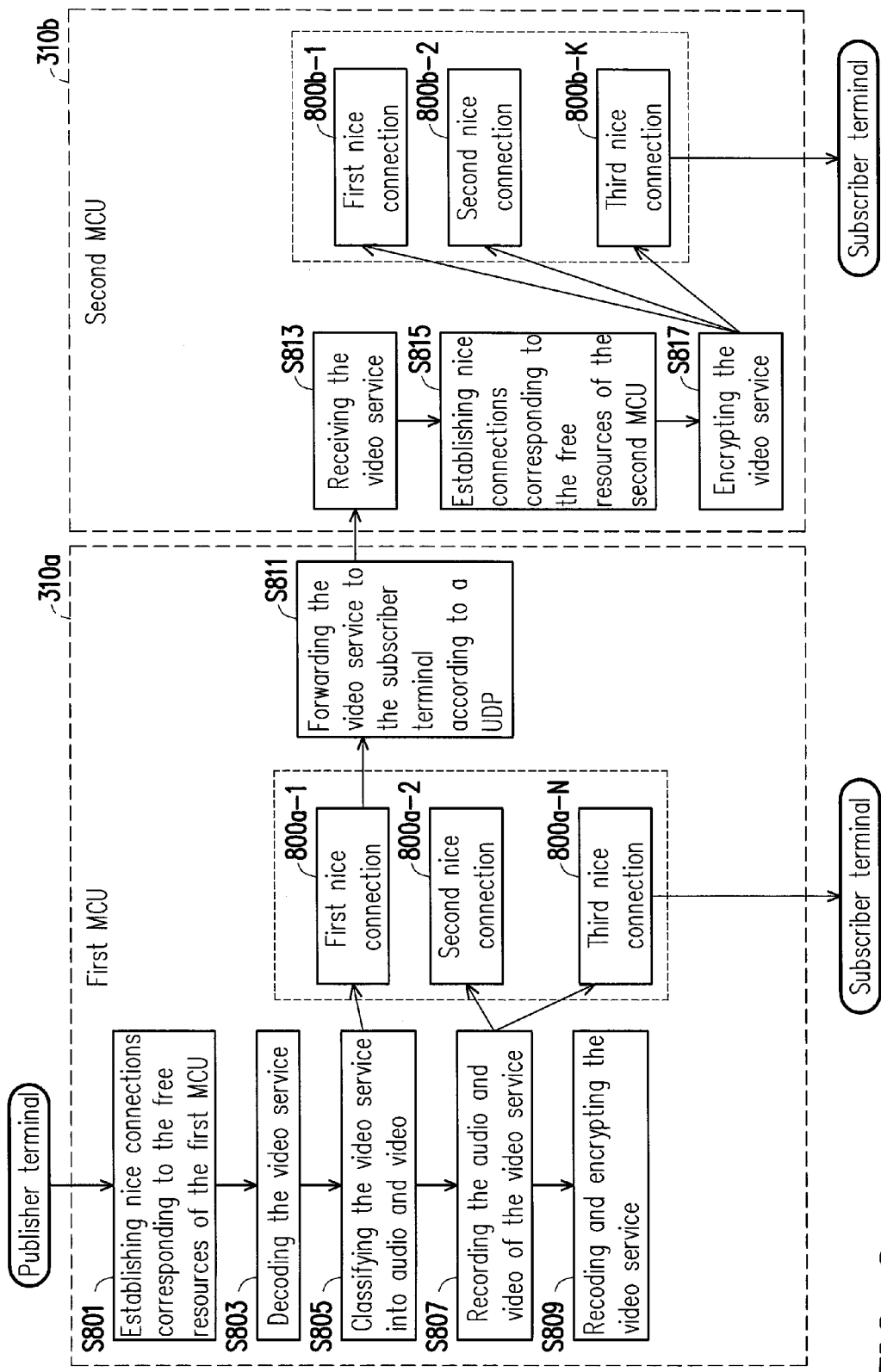
FIG. 8 is an operational schematic diagram of providing the video service according to the distribution result list of the first example.

FIG. 8 is an operational schematic diagram of providing the video service according to the distribution result list of the first example.

Referring to FIG. 8, in particular, after receiving a video service published by a publisher terminal and a distribution result list of a distribution order for assigning each MCU, in step S801, the first MCU 310a establishes nice connections corresponding to the free resources of the first MCU. For instance, in this example, the number of free resources that can be provided by the first MCU 310a is 2000, and thus, the first MCU 310a establishes 2000 nice connections (800a-1 through 800a-N, where N is 2000). Then, in step S803, the coding/decoding module 312a of the first MCU 310a decodes the video service, and in step S805, the recording module 314a of the first MCU 310a classifies the video service into audio and video. Then, in step S807 the recording module 314a of the first MCU 310a records the audio and the video of the video service. In step S809, the coding/decoding module 312a of the first MCU 310a recodes and encrypts the video service. In the present exemplary embodiment, in the MCUs recorded in the obtained distribution result list, the first MCU 310*a* and the second MCU 310*b* are sequentially assigned, and thus, when subscriber terminals subscribe the video service in turn, the video service that is encrypted in step S809 is forwarded to the subscriber terminals through nice connections (e.g., the second nice connection 800*a*-2 through the Nth nice connection 800*a*-N) of the first MCU 310*a* other than a first nice connection 800*a*-1, and when the number of the subscriber terminals is greater than the number of free resources of the first MCU 310*a*, (i.e., the nice connections corresponding to the free resources in the first MCU 310*a* are all distributed), the MCU management module 322 assigns the first nice connection 800*a*-1 of the first MCU 310*a* for forwarding the video service to the second MCU 310*b* by using the forwarding module 316*a* according to a user datagram protocol (UDP) (step S811). When receiving the video service (step S813), in step S815, the second MCU 310*b* establishes nice connections (800*b*-1 through 800*b*-K, where K is 1500) corresponding to the free resources of the second MCU 310*b*, and after the coding/decoding module 312*b* encrypts the video service in step S817, the second MCU 310*b* forwards the video service to the subscriber terminals through the nice connections (800*b*-1 through 800*b*-K) of the second MCU 310*b*.

It is to be mentioned that the video service published by the publisher terminal is forwarded to the first MCU through a real-time transport protocol (RTP), and the subscriber terminals subscribe the video service by a browser through the RTP.

Second Example

In the second example, in order to mitigate efficiency loss during the operation of forwarding the video service among the MCUs, the MCU management module 322 of the invention would distribute the servicing number corresponding to the same video service to the same MCU as best as possible.

Herein, it is assumed that the numbers of free resources of the first MCU 310*a*, the second MCU 310*b* and the third MCU 310*c* are the same as those in the first example. Thus, the MCU management module 322 descendingly sorts the MCUs according to the number of free resources of each of the MCUs to obtain an available resource list with the first MCU 310*a*, the second MCU 310*b* and the third MCU 310*c* sorted in order.

In this example, it is assumed that a servicing number to be served by the video service published by the publisher terminal that is received by the MCU management module 322 is 2000 people, and a number to be distributed corresponding to the video service that is set according to the servicing number corresponding to the video service is 2000. For instance, the MCU management module 322 may first assign the first MCU 310*a* according to the available resource list for determining whether it is a target MCU among the appropriate MCUs. Since the 2000 free resources that can be provided by the first MCU 310*a* just match the number to be distributed of 2000 corresponding to the video service, the MCU management module 322 distributes the 2000 free resources that can be provided by the first MCU 310*a* to the number to be distributed of 2000 corresponding to the video service and further determines whether the number to be distributed corresponding to the people to be served by the video service can be fully distributed with the free resources of the MCUs. Accordingly, the MCU management module 322 and only adds the first MCU 310*a* into the distribution result list. That is to say, when subscriber terminals subscribe the video service in turn, the encrypted video service may be forwarded to the subscriber terminals through any one of the nice connections of the first MCU 310*a*, without forwarding the video service to the other MCUs. Thereby, the efficiency loss during the operation of forwarding the video service among the MCUs can be mitigated.

Third Example

In the third example, with the distribution result list of the distribution order for the assignment of each MCU that is executed by the MCU management module 322 according to the servicing number to be served by the video service, the MCUs having less free resources among the MCUs may be used to satisfy the serving number to be served by the video service published by the publisher terminal, and the MCUs having more free resources are saved for the servicing number with more people demanding for the video service.

In the present exemplary embodiment, it is assumed that the first MCU 310*a* has 2000 free resources, the second MCU 310*b* has 1500 free resources and the third MCU 310*c* has 600 free resources. Thus, the MCU management module 322 descendingly sorts the MCUs according to the number of free resources of each of the MCUs to obtain an available resource list with the first MCU 310*a*, the second MCU 310*b* and the third MCU 310*c* sorted in order. In the meantime, it is assumed that a servicing number to be served by the video service published by the publisher terminal that is received by the MCU management module 322 is 500 people, and a number to be distributed corresponding to the video service that is set according to the servicing number corresponding to the video service is 500.

In particular, the MCU management module 322 first assigns the first MCU 310*a* according to the available resource list for determining whether it is a target MCU among the appropriate MCUs. Since the 2000 free resources that can be provided by the first MCU 310*a* is much more than the number to be distributed of 500, it will lead to a waste of the free resources if the free resources of the first MCU 310*a* are distributed to the current number to be distributed. Thus, the MCU management module 322 may assign the second MCU 310*b* according to the available resource list for determining whether it is a target MCU among the appropriate MCUs. In this case, the MCU management module 322 determines that the number of free resources that can be provided by the second MCU 310*b* is 1500 and is still more than the current number to be distributed. Accordingly, the MCU management module 322 may continue to assign the third MCU 310*c* according to the available resource list for determining whether it is a target MCU among the appropriate MCUs. In this case, the MCU management module 322 determines that the number of free resources that can be provided by the third MCU 310*c* is 600 and is the closet to the current number to be distributed, which is 500. It also means that it will not cause too many wastes of the free resources if the free resources of the third MCU 310*c* are distributed to the number to be distributed. Accordingly, the MCU management module 322 only adds the third MCU 310*c* into the distribution result list.

That is to say, when subscriber terminals subscribe the video service in turn, the MCU management module 322 assigns the first nice connection 800*a*-1 of the first MCU 310*a* for forwarding the video service to the third MCU 310*c* by using the forwarding module 316*a* according to the UDP. When receiving the video service, the third MCU 310*c* establishes nice connections corresponding to the free resources of the third MCU 310*c*. For instance, in this example, the number of free resources that can be provided by the third MCU 310*c* is 600, and thus, the third MCU 310*c* establishes 600 nice connections the third MCU 310c forwards the video service to the subscriber terminals through the nice connections of the third MCU 310c. Therefore, when the serving number to of people to be served by the video service is small, the MCU management module 322 uses the MCUs having less free resources in the MCU cluster 310 to satisfy the serving number to be served by the video service published by the publisher terminal to save the MCUs having more free resources for the servicing number with more people demanding for the video service.

To conclude, in the method and the system for providing the video service of the invention, a plurality of MCUs is configured in the video service providing system to form at least one MCU cluster. When the number of the subscriber terminals which subscribes the video service is greater than the number of free resources that can be provided by one single MCU, the video service can be forwarded among the MCUs in the MCU cluster, such that the subscriber terminals are not limited to subscribing the video service only through the single MCU. Accordingly, the method and the system for providing a video service of the invention can effectively increase the number of people participating in the video service. Moreover, in the method and the system for providing the video service of the invention, the free resources of the MCUs can be dynamically distributed according to the number of people to be served by the video service so as to provide an optimal solution for resource distribution. Thereby, the number of forwarding the video service can be reduced, such that system resources can be saved, energy loss can be mitigated, and service performance can be enhanced.

What is claimed is:

1. A method for providing a video service, for distributing a plurality of multipoint control units (MCU) in an MCU cluster to forward the video service via a controller, the method comprising:
   receiving the video service published by a publisher terminal through a first MCU among the MCUs;
   forwarding the video service from the first MCU to at least one second MCU among the MCUs and establishing at least one connection corresponding to the video service in the at least one second MCU,
   wherein at least one subscriber terminal receives the video service through the at least one connection,
   wherein the step of forwarding the video service from the first MCU to the at least one second MCU among the MCUs and establishing the at least one connection corresponding to the video service in the at least one second MCU comprises:
   (a) receiving a servicing number of people who receive the video service via the controller;
   (b) setting a number to be distributed corresponding to the video service according to the servicing number of the video service;
   (c) sequentially assigning one of the MCUs as a target MCU according to an available resource list, determining whether each of the MCUs in the available resource list is sequentially assigned, performing step (d) if there is any unassigned MCU and performing step (j) if each of the MCUs is already assigned;
   (d) determining whether the number to be distributed is greater than 0, performing step (e) if the number to be distributed is greater than 0 and performing step (j) if the number to be distributed is less than or equal to 0;
   (e) deducting the number to be distributed from a number of free resources of the target MCU, determining whether a value of the number of free resources deducting the number to be distributed is greater than, equal to or less than 0, performing step (f) if the value is greater than 0, performing step (g) if the value is less than 0 and performing step (h) if the value is equal to 0;
   (f) storing an index of the target MCU, recording a first parameter as the index of the target MCU and re-performing step (c) to assign a next MCU as the target MCU;
   (g) determining whether the index of the previous target MCU is recorded in the first parameter, performing step (h) if no, and performing step (i) if yes;
   (h) storing the index of the target MCU and recording the first parameter as the index of the target MCU;
   (i) adding the MCU corresponding to the index of the previous target MCU recorded in the first parameter into an distribution result list, clearing values recorded in the first parameter, updating the number to be distributed as a value obtained by deducting the number of free resources of the MCU corresponding to the index of the previous target MCU from the number to be distributed and re-performing step (c) to assign a next MCU as the target MCU;
   (j) determining whether the index of the previous target MCU is recorded in the first parameter, if yes, adding the MCU corresponding to the index of the MCU recorded in the first parameter into the distribution result list and updating the number to be distributed as a value obtained by deducting the number of free resources of the MCU corresponding to the index of the MCU recorded in the first parameter from the number to be distributed and if no, performing step (k); and
   (k) forwarding the video service to the at least one second MCU among the MCUs according to the distribution result list.

2. The method according to claim 1, wherein the step of forwarding the video service from the first MCU to the at least one second MCU among the MCUs and establishing the at least one connection corresponding to the video service in the at least one second MCU comprises:
   obtaining a plurality of MCUs having free resources from the plurality of MCUs; and
   calculating the number of free resources of each of the MCUs which have the free resources and descendingly sorting the MCUs according to the number of free resources of each of the MCUs to obtain the available resource list,
   wherein the obtained MCUs which have the free resources are MCUs registered to the controller.

3. The method according to claim 2, wherein the step of calculating the number of free resources of the MCUs which have the free resources and sorting the MCUs in the descending order according to the number of free resources of each of the MCUs to obtain the available resource list comprises:
   storing the numbers of the free resources of the MCUs having the free resources and the available resource list.

4. The method according to claim 1, wherein the step of forwarding the video service from the first MCU to the at least one second MCU among the MCUs and establishing the at least one connection corresponding to the video service in the at least one second MCU comprises:
   establishing connections corresponding to the free resources of the first MCU through the first MCU and through a first connection of the first MCU, forwarding the video service to the at least one second MCU according to a transmission protocol;
   establishing connections corresponding to the free resources of the at least one second MCU through the at least one second MCU; and forwarding the video service to the at least one subscriber terminal through the at least one connection corresponding to the at least one second MCU.

5. The method according to claim 4, further comprising: forwarding the video service to the at least one subscriber terminal through at least one second connection of the first MCU.

6. The method according to claim 4, wherein the transmission protocol is a user datagram protocol (UDP).

7. The method according to claim 1, wherein the step of receiving the video service published by the publisher terminal through the first MCU among the MCUs comprises:
decoding the video service, classifying and recording audio and video of the video service and recoding the video service.

8. The method according to claim 1, wherein the video service published by the publisher terminal is forwarded to the first MCU through a real-time transport protocol (RTP).

9. The method according to claim 8, wherein the subscriber terminal subscribes the video service by a browser through the RTP.

10. A system for providing a video service, comprising:
a multipoint control unit (MCU) cluster, having a plurality of MCUs, wherein a first MCU among the MCUs receives a video service published by a publisher terminal through; and
a controller, coupled to a database and the MCU cluster, wherein the controller is configured to distribute the MCUs of the MCU cluster and comprises:
an MCU management module, configured to assign the first MCU to forward the video service to at least one second MCU among the MCUs and establishing at least one connection corresponding to the video service in the at least one second MCU;
a data access object (DAO), coupled to the database and configured to access the database; and
an authority administration module, configured to permit the MCUs to access the database through the DAO;
wherein at least one subscriber terminal receives the video service through the at least one connection,
wherein the MCU management module is configured to:
(a) receive a servicing number of people who receive the video service;
(b) set a number to be distributed corresponding to the video service according to the servicing number corresponding to the video service;
(c) sequentially assign one of the MCUs as a target MCU according to an available resource list, determine whether each of the MCUs in the available resource list is sequentially assigned, perform step (d) if there is any unassigned MCU and perform step (j) if each of the MCUs is already assigned;
(d) determine whether the number to be distributed is greater than 0, perform step (e) if the number to be distributed is greater than 0 and perform step (j) if the number to be distributed is less than or equal to 0;
(e) deduct the number to be distributed from a number of free resources of the target MCU, determine whether a value of the number of free resources deducting the number to be distributed is greater than, equal to or less than 0, perform step (f) if the value is greater than 0, perform step (g) if the value is less than 0 and perform step (h) if the value is equal to 0;
(f) store an index of the target MCU, record a first parameter as the index of the target MCU and re-perform step (c) to assign a next MCU as the target MCU;

(g) determine whether the index of the previous target MCU is recorded in the first parameter, perform step (h) if no and perform step (i) if yes;
(h) store an index of the target MCU and record the first parameter as the index of the target MCU;
(i) add the MCU corresponding to the index of the previous target MCU recorded in the first parameter into an distribution result list, clear values recorded in the first parameter, update the number to be distributed as a value obtained by deducting the number of free resources of the MCU corresponding to the index of the previous target MCU from the number to be distributed and re-perform step (c) to assign a next MCU as the target MCU;
(j) determine whether the index of the previous target MCU is recorded in the first parameter, if yes, add the MCU corresponding to the index of the MCU recorded in the first parameter into the distribution result list and update the number to be distributed as a value obtained by deducting the number of free resources of the MCU corresponding to the index of the MCU recorded in the first parameter from the number to be distributed and if no, perform step (k);
(k) forward the video service to the at least one second MCU among the MCUs according to the distribution result list.

11. The system according to claim 10, wherein the MCU management module is further configured to obtain a plurality of MCUs which have free resources from the plurality of MCUs,
wherein the MCU management module is further configured to calculate the number of free resources of each of the MCUs which have the free resources and descendingly sort the MCUs according to the number of free resources of each of the MCUs to obtain the available resource list, and
wherein the obtained MCUs which have the free resources are MCUs registered to the authority administration module of the controller.

12. The system according to claim 11, wherein the MCU management module is further configured to store the numbers of the free resources of the MCUs which have the free resources and the available resource list in the database.

13. The system according to claim 10, wherein the first MCU establishes connections corresponding to the free resources of the first MCU, and the MCU management module is further configured to assign the first MCU to forward the video service to the at least one second MCU according to a transmission protocol through a first connection among the connections of the first MCU,
wherein the at least one second MCU establishes connections corresponding to the free resources of the at least one second MCU, and
wherein the MCU management module is further configured to assign the at least one connection corresponding to the at least one second MCU to forward the video service to the at least one subscriber terminal.

14. The system according to claim 13, wherein the MCU management module is further configured to assign at least one second connection of the first MCU to forward the video service to the at least one subscriber terminal.

15. The system according to claim 13, wherein the transmission protocol is a user datagram protocol (UDP).

16. The system according to claim 10, wherein each of the MCUs comprises a coding/decoding module and a recording module, the coding/decoding module is configured to decode and recode the video service, and the recording module is configured to classify and record audio and video of the video service.

17. The system according to claim 10, wherein the video service published by the publisher terminal is forwarded to the first MCU by a master server through a real-time transport protocol (RTP).

18. The system according to claim 17, wherein the subscriber terminal subscribes the video service by a browser through the RTP.

* * * * *